United States Patent [19]

Sasazaki

[11] Patent Number: 4,658,314
[45] Date of Patent: Apr. 14, 1987

[54] FLOATING TYPE MAGNETIC HEAD

[75] Inventor: Isao Sasazaki, Ojiya, Japan

[73] Assignee: Alps Electric Co., Ltd., Japan

[21] Appl. No.: 683,879

[22] Filed: Dec. 20, 1984

[30] Foreign Application Priority Data

Dec. 20, 1983 [JP] Japan .................. 58-240487

[51] Int. Cl.[4] ............................................ G11B 15/64
[52] U.S. Cl. ................................................. 360/103
[58] Field of Search ............... 360/103, 102, 120, 129, 360/104, 122

[56] References Cited

U.S. PATENT DOCUMENTS

| 3,823,416 | 7/1974 | Warner | 360/103 |
| 3,922,776 | 12/1975 | Alger et al. | 360/103 X |
| 4,419,705 | 12/1983 | Brower et al. | 360/103 |
| 4,555,739 | 11/1985 | Le Van et al. | 360/103 |

FOREIGN PATENT DOCUMENTS

| 0074413 | 7/1978 | Japan | 360/103 |
| 0151425 | 11/1979 | Japan | 360/103 |
| 0012513 | 1/1980 | Japan | 360/103 |
| 0041523 | 4/1981 | Japan | 360/103 |
| 0027467 | 2/1982 | Japan | 360/122 |
| 0215022 | 4/1984 | Japan | 360/103 |

Primary Examiner—Robert S. Tupper
Assistant Examiner—Andrew L. Sniezek
Attorney, Agent, or Firm—Guy W. Shoup

[57] ABSTRACT

A floating type magnetic head comprises a slider made of a nonmagnetic material and a magnetic core inserted in a core inserting groove formed through the slider so that the magnetic core is bonded at the inserted position by a bonding agent consisting of glass. A slider groove is formed at a central part of the slider, while floating surfaces are formed on both sides of the slider groove, with the core inserting groove formed in communication with the slider groove.

3 Claims, 3 Drawing Figures

FLOATING TYPE MAGNETIC HEAD

BACKGROUND OF THE INVENTION

1. Field of the Invention

This invention relates to a floating type magnetic head, and more particularly to a type thereof wherein the area of bonding glass exposed to the floating surface of the magnetic head is minimized.

2. Description of Prior Art

Heretofore, a floating type magnetic head has been constructed such that a slider groove 2 is formed at a central part of a slider 1 made of a nonmagnetic material such as ceramic, so that floating surfaces 3 and 4 are formed on both sides of the slider groove 2 as shown in FIG. 1. A core inserting groove 5 is formed in one of the floating surfaces 3 and 4 at an intermediate position, and a magnetic core 6 made of ferrite and the like provided with a track forming portion 6a at an end is inserted in the core inserting groove 5 to be bonded by bonding glass 7 as shown in FIG. 2. The track forming portion 6a is provided by subjecting two side surfaces of the end portion of the magnetic core 6 to machining. A cut-away portion 9 is formed on one side surface of the slider 1 for providing a coil winding space.

The floating surfaces 3 and 4 are lapped and polished into mirror surfaces. However, since the machinability of the slider 1, glass portion 7 and the ferrite core 6 exposed to these surfaces is different between each other, recesses 7a tend to be formed in the bonding glass portion 7.

When the floating type magnetic head is operated for recording and reproducing data in and out of a magnetic medium (not shown), the recording medium is rotated at a high speed to produce an air flow that causes the magnetic head to float with a slight distance maintained from the surface of the recording medium. In this case, since the conventional construction of the floating type magnetic head has recessed portions 7a, as described above, on the surfaces of the glass portions 7, a negative pressure is produced in the recessed portions 7a. The production of the negative pressure deteriorates the floating posture of the magnetic head, causing head-crush against the recording medium and inviting a disadvantage of damaging the recording medium. Furthermore, a transducing gap 8 provided in the magnetic core 6 is placed in the inserting groove 5 surrounded by the slider 1, and therefore the gap 8 cannot be observed from outside, such a feature rendering the control of the depth of the gap 8 to be extremely difficult.

SUMMARY OF THE INVENTION

An object of the present invention is to provide a floating type magnetic head wherein the above described difficulties of the conventional magnetic head can be eliminated substantially.

Another object of the invention is to provide a floating type magnetic head wherein the area of the glass portion exposed to the floating surface of the magnetic head is substantially reduced for eliminating the difficulties.

These and other objects of the invention can be achieved by a floating type magnetic head comprising a slider made of a nonmagnetic material and a magnetic core inserted in a core inserting groove formed through the slider to be bonded therein by a bonding agent consisting of glass, wherein a slider groove is formed at a central part of the slider so that floating surfaces are formed on both sides of the slider groove, and the core inserting groove is formed in communication with the slider groove.

Preferably one side wall of the core inserting groove is partly cut away for providing a communicating portion between the core inserting groove and the slider groove, and the magnetic core inserted in the core inserting groove is bonded by applying the bonding agent through the communicating portion.

DESCRIPTION OF THE PREFERRED EMBODIMENT

Figure 1:
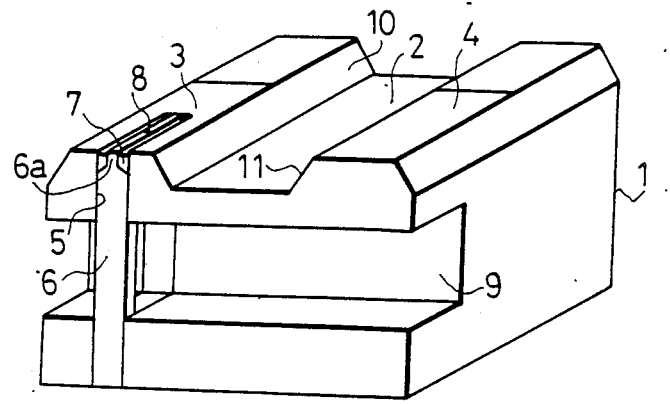
FIG. 1 is a perspective view showing a conventional floating type magnetic head.
Figure 2:
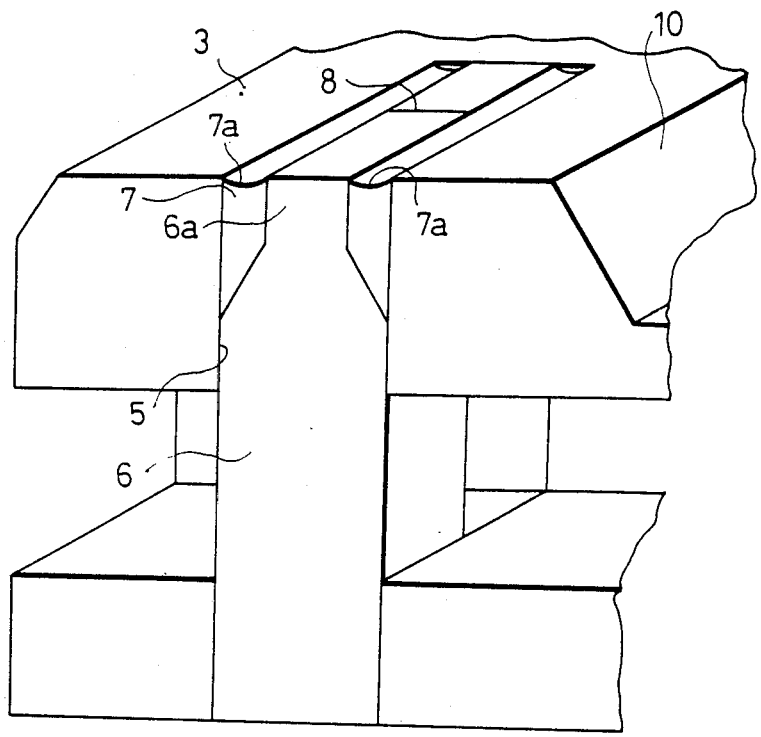
FIG. 2 is a perspective view, on an enlarged scale, showing an important part of the magnetic head shown in FIG. 1.
Figure 3:
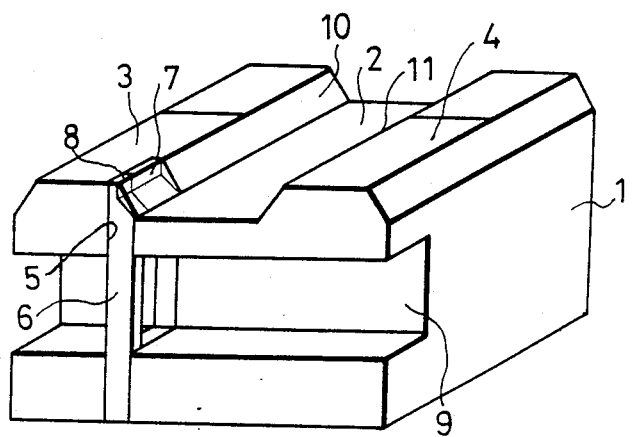
FIG. 3 is a perspective view showing a floating type magnetic head constituting a preferred embodiment of the present invention.

A preferred embodiment of the present invention will now be described with reference to FIG. 3. A floating type magnetic head constituting the embodiment of this invention comprises a slider 1 made of a nonmagnetic material such as a ceramic. At a central part of the slider 1 is provided a slider groove 2, on both sides of which are provided floating surfaces 3 and 4. A core inserting groove 5 is formed through one of the two floating surfaces 3 and 4 at a position near the slider groove 2. A magnetic core 6 made of ferrite or the like and having a track portion 6a at an end thereof is inserted into the core inserting groove 5 to be bonded by a bonding agent 7 consisting of glass.

The track portion 6a of the magnetic core 6 is formed by partly cutting off one side of the magnetic core 6, and the bonding glass 7 is applied to the partly cut-off portion of the magnetic core 6. After the insertion of the magnetic core 6 into the core inserting groove 5, tapered surfaces 10 and 11 may be formed on both sides of the slider groove 2 simultaneously or after the formation of the slider groove 2 for substantially removing the bonding glass exposed to the floating surfaces 3 and 4. Because of the elimination of the bonding glass exposed to the floating surfaces, the formation of the recessed portions 7a in the bonding glass 7 at the time of lapping or polishing the mirror surfaces out of the floating surfaces 3 and 4 in the conventional construction of the floating type magnetic head can be substantially eliminated.

According to the present invention, since the floating surfaces are provided on both sides of the slider groove, and the core inserting groove is provided in one of the floating surfaces at a position near the slider groove, the area of the bonding glass 7 exposed to the floating surfaces can be substantially reduced, and the recessed portions tending to be created on the bonding glass at the time of lapping and polishing the floating surfaces can be thereby substantially reduced. The reduction of the recessed portions reduces the negative pressure created at the time of floating the magnetic head.

Furthermore, the transducing gap which is provided in the magnetic core inserted in the core inserting groove can be observed from the slider groove through the bonding glass, thus realizing an advantageous effect of facilitating the control of the depth of the transducing gap.

What is claimed is:

1. In a floating type magnetic head, for recording on and reproducing from a magnetic recording medium, comprising a pair of side portions each having a floating surface at one level facing the recording medium and adapted to float a small distance from the recording medium, a slider groove formed between said side portions defined by a bottom surface recessed below the level of said floating surfaces and a pair of tapered surfaces each bordering a respective one of said side portions and extending from said bottom surface of said slider groove to the floating surface of the respective one of said side portions, a core inserting groove extending through one of said side portions to the floating surface of said one side portion, and a magnetic core member disposed in said core inserting groove having an end portion extending to the level of said floating surface of said one side portion, said magnetic core member being fixedly mounted in said core inserting groove by a glass bonding agent applied around said core end portion in said core inserting groove, the improvement wherein said slider groove is formed with a portion of the tapered surface bordering said one side portion cut away below the level of said floating surface forming a recess in the tapered surface of said one side portion, said core inserting groove is located in said one side portion such that a part of said core when inserted in the core inserting groove proximate said core end portion has a common boundary with said recess in said tapered surface, and the glass bonding agent for fixedly mounting said magnetic core member in said core inserting groove is filled only in the recess in a space defined between said common boundary and said tapered surface such that no significant amount of the glass bonding agent is exposed at the level of said floating surface facing toward the recording medium.

2. A floating type magnetic head according to claim 1, wherein said magnetic core member has a rectangular cross section and said core end portion is formed as a narrowed extension on one side of said core member with the opposing side thereof cut away, said core end portion being disposed in said core inserting slot with said cut-away side facing said cut-away portion of said slider groove.

3. A floating type magnetic head according to claim 1, wherein after the bonding agent is filled in said defined space, said tapered surface of said slider groove bordering said one side portion is finished by removing any excess bonding agent flush with said tapered surface.

* * * * *